Aug. 26, 1924.  
D. E. ANDERSON  
1,506,551  
LEVELER ATTACHMENT TO VEHICLES  
Filed July 9, 1923    2 Sheets-Sheet 1
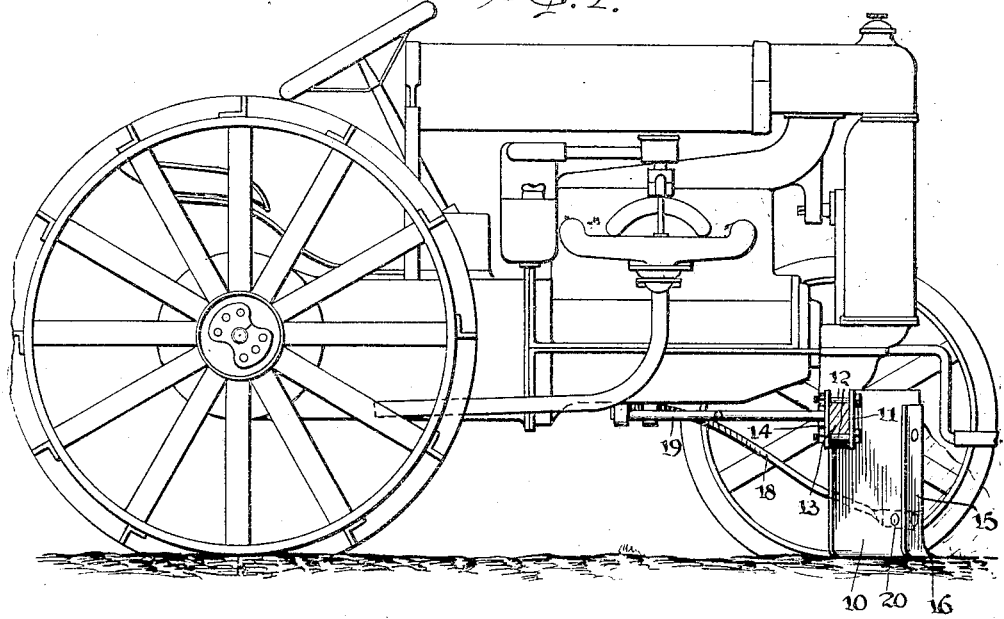
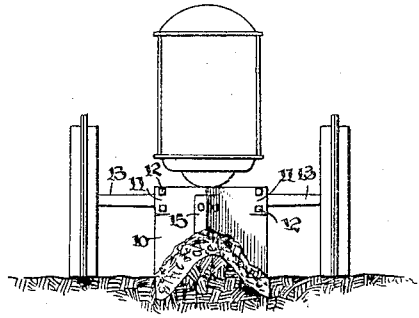
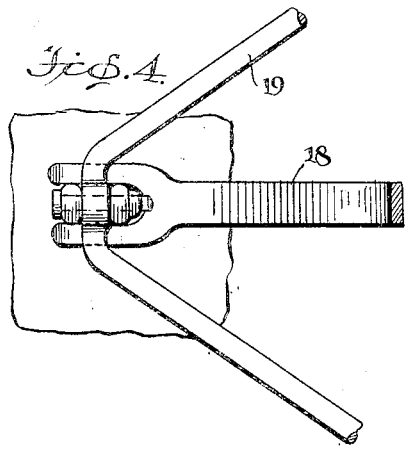
INVENTOR.
D. E. Anderson,
BY
Geo. P. Kimmel
ATTORNEY.

Aug. 26, 1924.
D. E. ANDERSON
1,506,551
LEVELER ATTACHMENT TO VEHICLES
Filed July 9, 1923     2 Sheets-Sheet 2
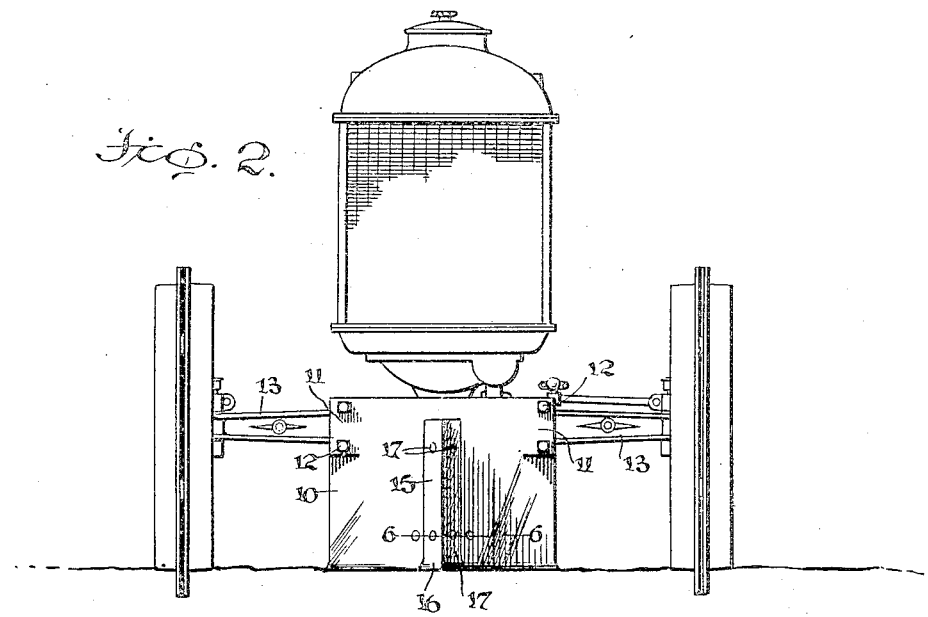
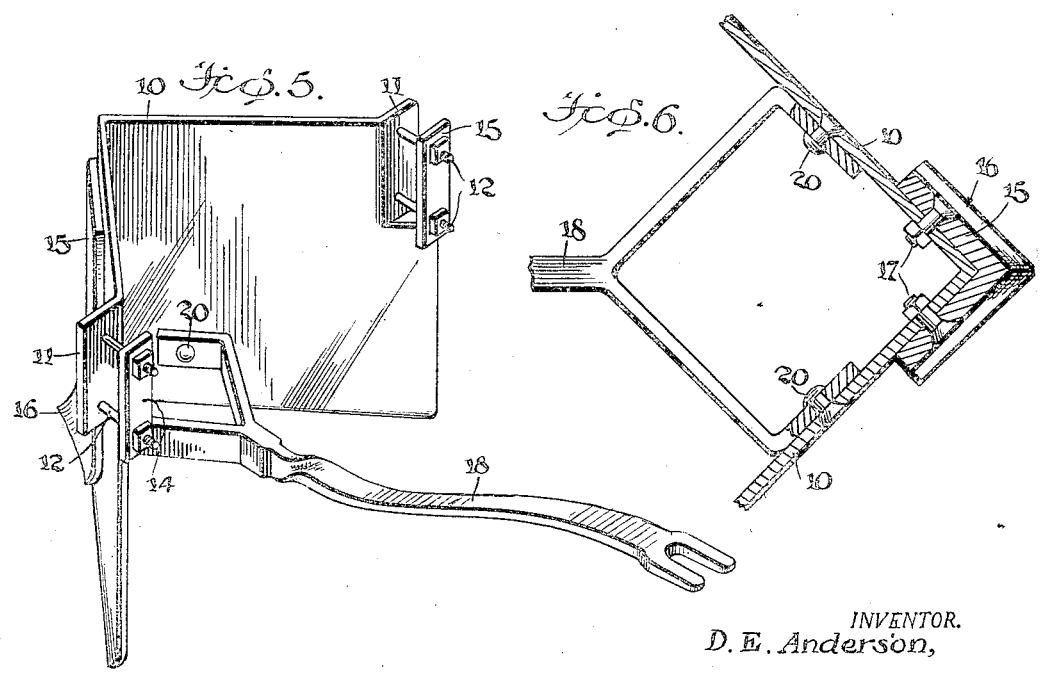
INVENTOR.
D. E. Anderson,
BY
Geo. P. Kimmel
ATTORNEY.

Patented Aug. 26, 1924.

1,506,551

UNITED STATES PATENT OFFICE.

DANIEL E. ANDERSON, OF YUBA CITY, CALIFORNIA.

LEVELER ATTACHMENT TO VEHICLES.

Application filed July 9, 1923. Serial No. 650,408.

*To all whom it may concern:*

Be it known that I, DANIEL E. ANDERSON, a citizen of the United States, residing at Yuba City, in the county of Sutter and State of California, have invented certain new and useful Improvements in Leveler Attachments to Vehicles, of which the following is a specification.

This invention relates to scraper or leveler attachments to vehicles, more particularly to motor driven vehicles of the tractor construction, and has for one of its objects to provide a simply constructed device of this character of increased efficiency and utility, and which may be readily adapted without material structural change to vehicles of various forms and construction.

Another object of the invention is to provide a device of this character which may be quickly attached or removed without detaching any portion of the vehicle or interfering with its ordinary uses or operation.

With these and other objects in view, the invention consists in certain novel features of construction as hereinafter shown and described and then specifically pointed out in the claims and in the drawings illustrative of the preferred embodiment of the invention—

Figure 1 is a side elevation of a conventional tractor with the improved device applied, the forward axle being in transverse section.

Fig. 2 is a front elevation of the parts shown in Fig. 1.

Fig. 3 is a view similar to Fig. 2 on a reduced scale, illustrating the operation of the leveler.

Fig. 4 is an enlarged detail plan view illustrating the construction of the coupling between the brace of the leveler and the frame of the vehicle.

Fig. 5 is a detached perspective view from the rear of the leveler device and its brace.

Fig. 6 is a transverse section enlarged on the line 6—6 of Fig. 2.

The improved device comprises a body 10 in V-shape traversely and with laterally directed wings 11 at the upper outer corners the latter pierced to receive clamp bolts 12 whereby the body may be attached to the forward axle of a vehicle, for instance of a conventional tractor, represented as a whole at 13, through the coaction therewith of clamp plates 14, as shown.

Bearing over the "nose" or forward portion of the body 10 is a V-shaped reinforcing member 15 outturned at the lower end as shown at 16, and riveted, bolted or otherwise attached to the body at 17.

A relatively heavy brace 18 is forked at each end and coupled by one forked end to the framework of the vehicle, for instance to the rearwardly extending axle braces 19, and riveted or otherwise connected at 20 to the side portions of the body 10.

The wings 11 being located at the upper edges of the body 10 and the brace 18 being attached to the body at the lower edge, the body is firmly and rigidly supported and adapted to effectively withstand the severe strains to which it will be subjected when in use.

The improved device is designed more particularly for levelling down ridges which have been thrown up by plows in irrigating orchards, vineyards and the like, preceding the cultivation, but it will be understood that it is not desired to limit the invention to any specific use to which it may be adapted.

The body 10 being V-shaped throws the earth in both directions, consequently there is no side draft to be overcome.

This form of leveler leaves the ground in substantially the same condition as before the ridges and furrows were made by the plows and throws the earth back from whence it was taken.

The presence of the leveler does not hamper or interfere with the movements of the vehicle, but is pushed along in front of the forward axle and precedes all the turnings and the course of the vehicle.

The improved device may be made of any suitable material and of any required size, and adapted for use upon any form of vehicle to which it is adapted.

The preferred embodiment of the invention is disclosed in the drawings and set forth in the specification, but it will be understood that modifications within the scope of the claims may be made in the construction without departing from the principle of the invention or sacrificing any of its advantages.

Having thus described the invention, what is claimed as new is:—

1. An attachment for a vehicle comprising a V-shaped member having oppositely directed upper portions at the rear and directed at right angles to the longitudinal axis of the member, and means adapted to connect said lateral portions to the axle of the vehicle.

2. An attachment for a vehicle comprising a V-shaped member having oppositely directed upper portions at the rear and directed at right angles to the longitudinal axis of the member, a brace coupled to the forward lower part of the member and adapted to be connected to the vehicle rearwardly of the forward axle, and means adapted to connect said lateral portions to the axle of the vehicle.

3. An attachment for a vehicle comprising a V-shaped member having oppositely directed upper portions at the rear and directed at right angles to the longitudinal axis of the member, means adapted to connect said lateral portions to the axle of the vehicle, and a reinforcing element attached to the forward vertical edge of the member with its lower end extending forwardly thereof and terminating in a cutting edge.

In testimony whereof, I affix my signature hereto.

DANIEL E. ANDERSON.